March 29, 1955

A. BERGERON 2,705,178

PISTON RINGS

Filed Jan. 18, 1954

INVENTOR,
Alfred Bergeron
BY
Mason, Mason & Sheridan
ATTORNEYS

United States Patent Office 2,705,178
Patented Mar. 29, 1955

2,705,178

PISTON RINGS

Alfred Bergeron, Dallas, Tex., assignor to Super-Seal Piston Ring Mfg. Corp., Rockwall, Tex., a corporation of Delaware Application January 18, 1954, Serial No. 404,405

16 Claims. (Cl. 309—46)

This invention relates to piston rings for pumps and internal combustion engines and is a continuation-in-part of my application Serial No. 128,892, filed November 22, 1949, now Patent No. 2,670,259 issued February 23, 1954.

The principal object of the invention is to provide a connection for the ends of a two-part ring which is free of gas leakage, both radially and longitudinally of the ring.

Another object is to provide a novel interlocking connection for the ends of a piston ring.

A further object is to provide a ring which may be readily manufactured in quantity and which, in use, will form an adequate seal for high compression engines.

Further objects will appear hereinafter throughout the specification.

Figure 1:
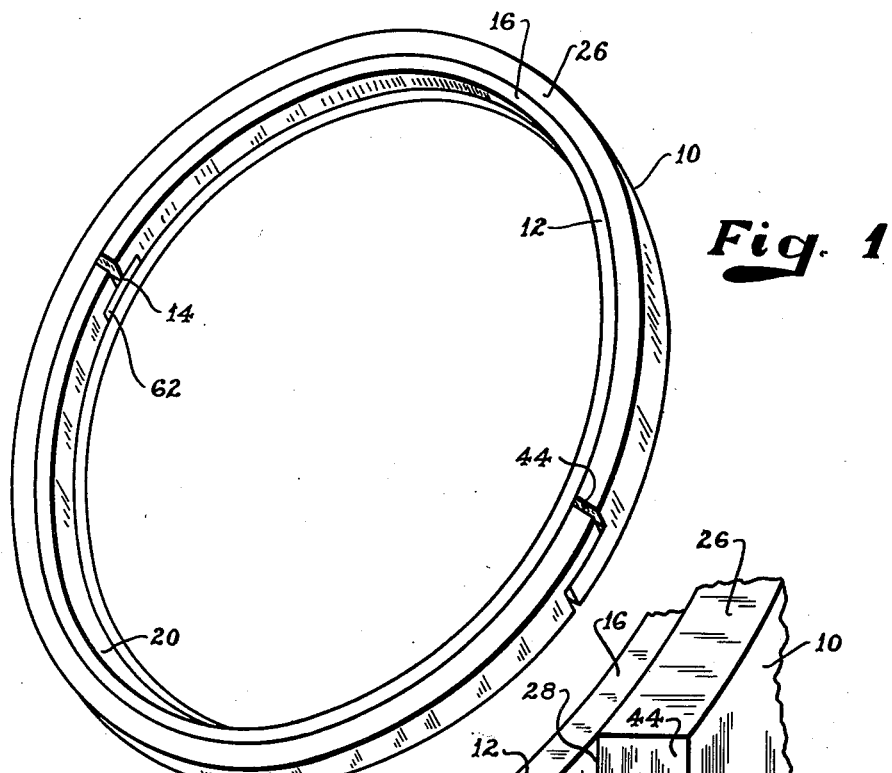
Figure 1 is a perspective view of a two-part ring, the outer ring of which is provided with the novel joint of this invention.

Referring to the drawings, the numeral 10 indicates the outer, and numeral 12 the inner, piston ring sections. The joint 14 for the inner ring may be substantially the same as that shown in Figures 7 and 9 of my co-pending application referred to above. However, any other suitable joint may be used for the ends of the inner ring section, and this invention is not concerned with the inner ring joint.

The inner split ring section has an upper substantially flat surface 16 located in a substantially horizontal plane, substantially vertical inner and outer surfaces 18 and 20, respectively, an inclined surface 22 and a second substantially vertical surface 24, below surface 20.

The outer ring section 10 has an upper surface 26, which merges with the surface 16 of the inner ring section. The inner circumference of the outer ring section is provided with mating surfaces which engage the inner ring section, and these consist of a substantially vertical surface 28 that engages surface 20, and inclined surface 30 which overlies, and is in engagement with, inner ring surface 22, and a second vertical surface 32 which is in engagement with surface 24.

Located below the surface 24 is a substantially horizontal surface 34. The outer ring section is also provided with a vertical surface 36, and a substantially horizontal under surface 38.

Figure 3:
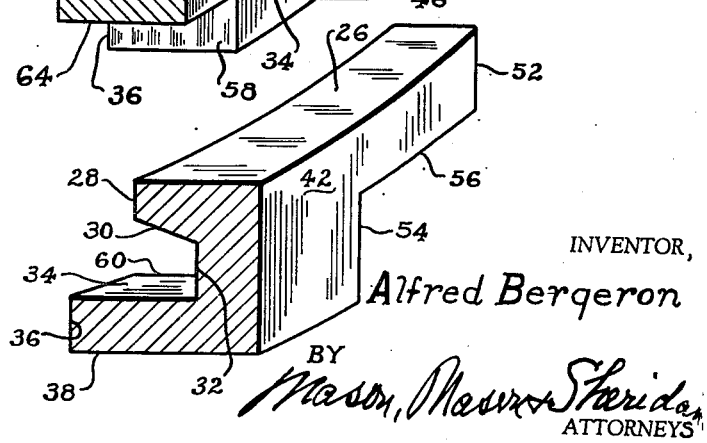
Figure 3 is a view of the opposite end of the outer ring shown in Figure 2 partly shown in section.

These surfaces 30, 32, and 34 form a groove as shown in Figure 3, for engagement of corresponding surfaces 22, 24, and 64 of the inner ring section.

Figure 2:
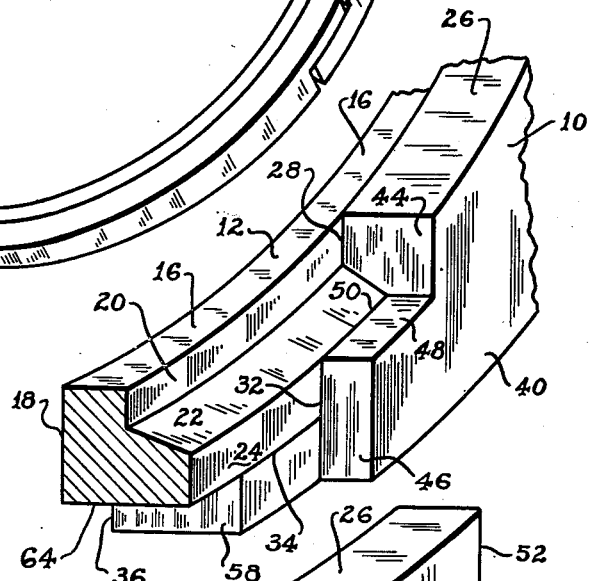
Figure 2 is an enlarged perspective view of both rings partly shown in section.

As particularly noted in Figures 2 and 3, the joint for the outer ring section consists of the ends 40 and 42. End 40 comprises substantially vertical surfaces 44 and 46, which are joined by horizontal surface 48, engaging the edge 50 which forms a line of division between the surfaces 22 and 24 of the inner ring section.

The opposite end of the outer ring section 42 is provided with a substantially vertical surface 52 corresponding to surface 44, a second vertical surface 54 corresponding to vertical surface 46, and a horizontal surface 56 corresponding to and overlying surface 48 of the opposite end of the outer ring section.

It will be further noted that the end 40 of the outer ring section is provided with a vertical surface 58 which is located in abutting relation with vertical surface 60 of the opposite end 42 of the said ring section.

It will be understood that the key 62 that is mounted on the outer ring section and which forms part of the joint 14 prevents relative rotation of the ring sections. However, other types of keys may be provided as stated heretofore in place of that shown. The bottom surface of the inner ring is shown in Figure 2 at 64.

The vertical, horizontal, and inclined surfaces of the respective ring sections, particularly those surfaces at the joint of the outer ring section, prevent leakage of gases, or fluid around the ring at the joint. These surfaces assist in the formation of extended wearing surfaces.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A piston ring construction comprising in combination inner and outer split ring sections, said outer ring section provided with an inwardly extending annular groove between the upper and lower sides thereof, said inner ring section having an outwardly extending portion disposed in said groove, the upper side of said portion being inclined downwardly and outwardly and the upper side of said groove being complemental thereto, opposite ends of said outer ring section being provided with a plurality of interengaging surfaces, said surfaces on each of said ends including at least three vertical spaced surfaces, and means holding said sections against relative rotation.

2. A piston ring construction comprising in combination inner and outer split ring sections, said outer ring section provided with an inwardly extending annular groove between the upper and lower sides thereof, said inner ring section having an outwardly extending portion disposed in said groove, the upper side of said portion being inclined downwardly and outwardly and the upper side of said groove being complemental thereto, opposite ends of said outer ring section being provided with a plurality of interengaging surfaces, said surfaces on each of said ends including at least three vertical spaced surfaces, each of said vertical surfaces of each end being spaced circumferentially from other vertical surfaces of that end, and means holding said sections against relative rotation.

3. A piston ring construction comprising in combination inner and outer split ring sections, said outer ring section provided with an inwardly extending annular groove between the upper and lower sides thereof, said inner ring section having an outwardly extending portion disposed in said groove, the upper side of said portion being inclined downwardly and outwardly and the upper side of said groove being complemental thereto, opposite ends of said outer ring section being provided with a plurality of interengaging surfaces, said surfaces on each of said ends including at least three vertical spaced surfaces, each of said vertical surfaces of each end being spaced laterally from other vertical surfaces of that end, and means holding said sections against relative rotation.

4. A piston ring construction comprising in combination inner and outer split ring sections, said outer ring sections provided with an inwardly extending annular groove between the upper and lower sides thereof, said inner ring section having an outwardly extending portion disposed in said groove, the upper side of said portion being incline downwardly and outwardly and the upper side of said groove being complemental thereto, opposite ends of said outer ring section being provided with a plurality of interengaging surfaces, said surfaces on each of said ends including at least three vertical spaced surfaces, each of said vertical surfaces being spaced circumferentially and laterally from other vertical surfaces of that end, and means holding said sections against relative rotation.

5. A piston ring construction comprising in combination inner and outer split ring sections, said outer ring sections provided with inwardly extending annular flanges with an annular groove therebetween, said inner ring section having an outwardly extending tapered annular rib disposed in and fitting said groove, the ring sections being of the same thickness and having their respective upper and lower faces in the same horizontal planes to fit in the piston ring groove in which the ring is designed to be used, the opposite ends of the outer ring section each having a plurality of vertical spaced surfaces, each of said vertical surfaces of each end being spaced circumferentially from other vertical surfaces of that end.

6. A piston ring construction comprising in combination inner and outer split ring sections of the same vertical thickness and with their respective upper and lower faces in the same parallel planes, said outer ring section provided with inwardly extending annular flanges with an annular groove therebetween, said inner ring section having an annular rib disposed in and fitting said groove and means holding said sections against relative rotation comprising a separate key secured to the inner section and recesses in opposite ends of the outer section fitting said key to form a seal preventing vertical blow-by, the opposite ends of the outer ring section each having a plurality of vertical spaced surfaces, each of said vertical surfaces of each end being spaced circumferentially from other vertical surfaces of that end.

7. A piston ring construction comprising in combination inner and outer split ring sections, said outer ring section provided with inwardly extending annular flanges with an annular groove therebetween, said inner ring section having an outwardly extending tapered annular rib disposed in and fitting said groove, the ring sections being of the same thickness and having their respective upper and lower faces in the same horizontal planes to fit in the piston ring groove in which the ring is designed to be used, the opposite ends of the outer ring section each having a plurality of vertical spaced surfaces, each of the said surfaces being spaced laterally from other vertical surfaces of that end.

8. A piston ring construction comprising in combination inner and outer split ring sections of the same vertical thickness and with their respective upper and lower faces in the same parallel planes, said outer ring section provided with inwardly extending annular flanges with an annular groove therebetween, said inner ring section having an annular rib disposed in and fitting said groove and means holding said sections against relative rotation comprising a separate key secured to the inner section and recesses in opposite ends of the outer section fitting said key to form a seal preventing vertical blow-by, the opposite ends of the outer ring section each having a plurality of vertical spaced surfaces, each of the said surfaces being spaced laterally from other vertical surfaces of that end.

9. A piston ring construction comprising in combination inner and outer split ring sections, said outer ring section provided with inwardly extending annular flanges with an annular groove therebetween, said inner ring section having an outwardly extending tapered annular rib disposed in and fitting said groove, the ring sections being of the same thickness and having their respective upper and lower faces in the same horizontal planes to fit in the piston ring groove in which the ring is designed to be used, the opposite ends of the outer ring section each having a plurality of vertical spaced surfaces, each of the said spaced surfaces being spaced circumferentially and laterally from the other vertical surfaces of that end.

10. A piston ring construction comprising in combination inner and outer split ring sections of the same vertical thickness and with their respective upper and lower faces in the same parallel planes, said outer ring section provided with inwardly extending annular flanges with an annular groove therebetween, said inner ring section having an annular rib disposed in and fitting said groove and means holding said sections against relative rotation comprising a separate key secured to the inner section and recesses in opposite ends of the outer section fitting said key to form a seal preventing vertical blow-by, the opposite ends of the outer ring section each having a plurality of vertical spaced surfaces, each of the said spaced surfaces being spaced circumferentially and laterally from other vertical surfaces of that end.

11. A piston ring constructed as defined in claim 5 wherein the rib of the inner ring and the groove of the outer ring are provided with juxtaposed tapered surfaces.

12. A piston ring constructed as defined in claim 6 wherein the rib of the inner ring and the groove of the outer ring are provided with juxtaposed tapered surfaces.

13. A piston ring construction as defined in claim 7 wherein the rib of the inner ring and the groove of the outer ring are provided with juxtaposed tapered surfaces.

14. A piston ring construction as defined in claim 8 wherein the rib of the inner ring and the groove of the outer ring are provided with juxtaposed tapered surfaces.

15. A piston ring constructed as defined in claim 9 wherein the rib of the inner ring and the groove of the outer ring are provided with juxtaposed tapered surfaces.

16. A piston ring construction as defined in claim 10 wherein the rib of the inner ring and the groove of the outer ring are provided with juxtaposed tapered surfaces.

References Cited in the file of this patent

UNITED STATES PATENTS

| | | |
|---|---|---|
| 684,321 | St. John | Oct. 8, 1901 |
| 1,186,980 | Gill | June 13, 1916 |
| 1,285,780 | Moratta | Nov. 26, 1918 |
| 1,360,820 | Thompson | Nov. 30, 1920 |
| 2,052,160 | Barnes | Aug. 25, 1936 |
| 2,190,204 | Bergeron | Feb. 13, 1940 |